(No Model.) 3 Sheets—Sheet 2.

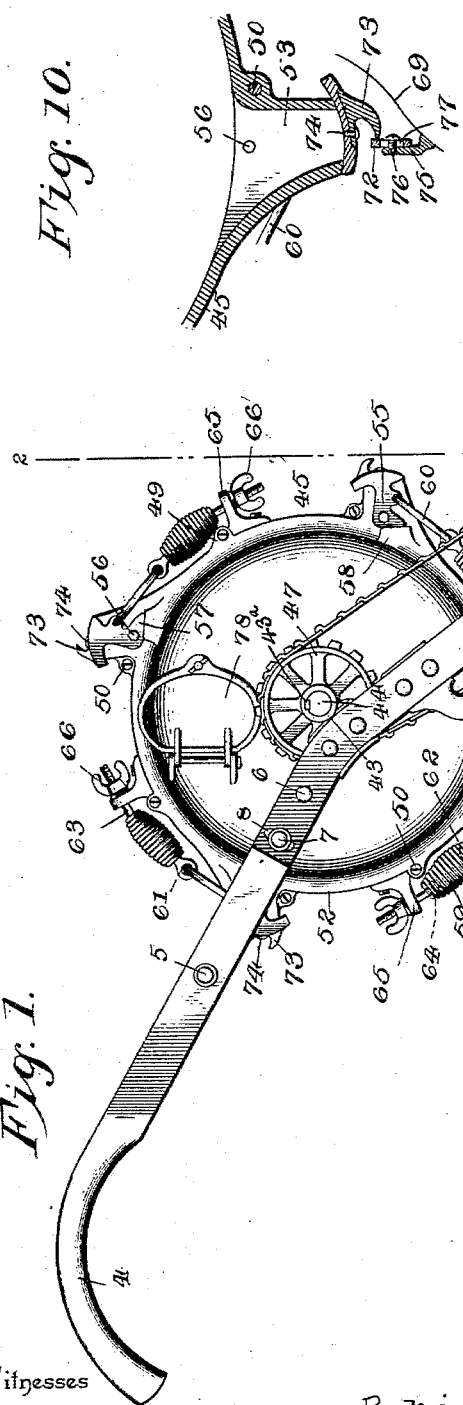

W. W. KENT.
COTTON PLANTER.

No. 556,824. Patented Mar. 24, 1896.

Inventor
William W. Kent,
By his Attorneys,
C. A. Snow & Co.

Witnesses
Chas. A. Ford (No Model.) 3 Sheets—Sheet 3.
W. W. KENT.
COTTON PLANTER.
No. 556,824. Patented Mar. 24, 1896.
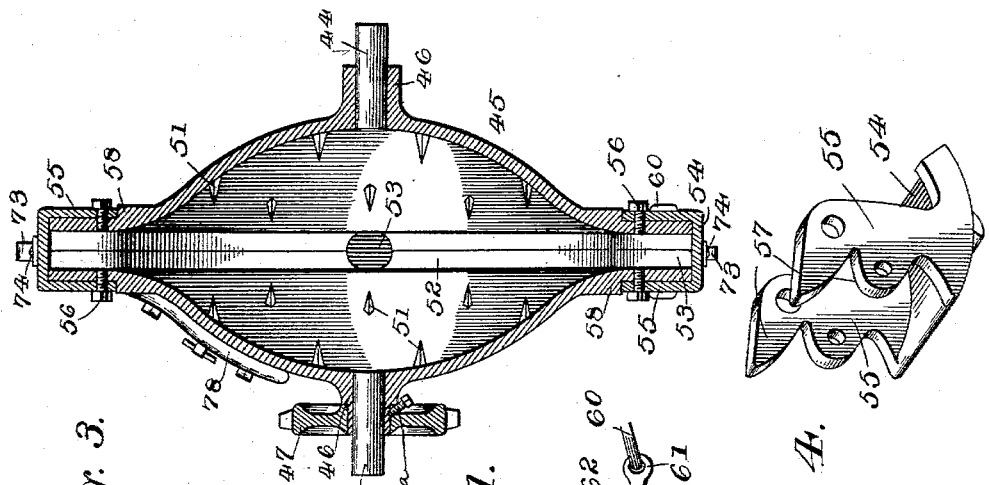
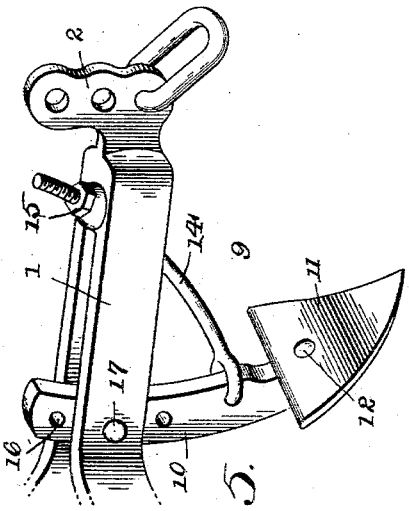
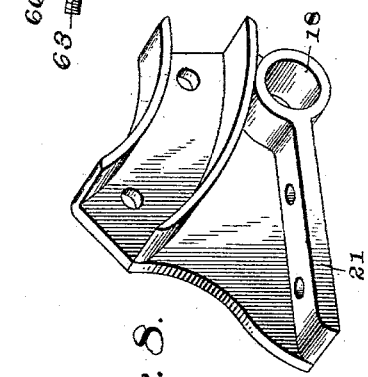
Witnesses
Chas. A. Ford
Inventor
William W. Kent,
By his Attorneys,

UNITED STATES PATENT OFFICE.

WILLIAM W. KENT, OF MACON, GEORGIA.

COTTON-PLANTER.

SPECIFICATION forming part of Letters Patent No. 556,824, dated March 24, 1896.

Application filed April 12, 1895. Serial No. 545,519. (No model.)

*To all whom it may concern:*

Be it known that I, WILLIAM W. KENT, a citizen of the United States, residing at Macon, in the county of Bibb and State of Georgia, have invented a new and useful Cotton-Planter, of which the following is a specification.

My invention relates to cotton-planters, and has for its object to provide a simple and efficient mechanism whereby cotton and other seed may be planted in hills at the desired intervals without manual operation of the seed-valves during the use of the apparatus; to provide improved furrow opening and closing devices whereby the seed is deposited at the bottom of a furrow provided for its reception; to provide improved means for regulating the amount of seed deposited in each hill, and to provide means for adjusting the parts to secure different intervals between the hills.

Further objects and advantages of this invention will appear in the following description, and the novel features thereof will be particularly pointed out in the appended claims.

Figure 6:
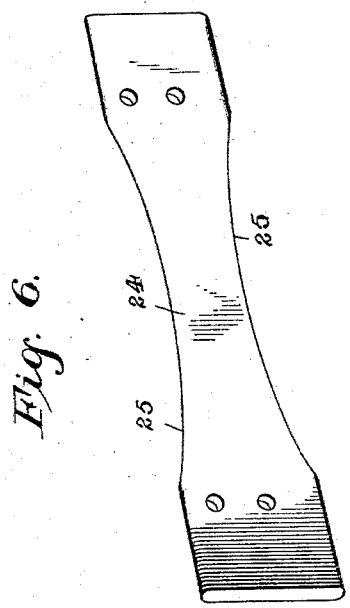
Figure 7:
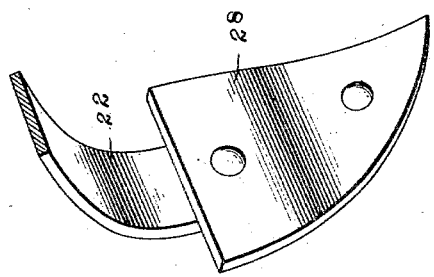
Figure 2:
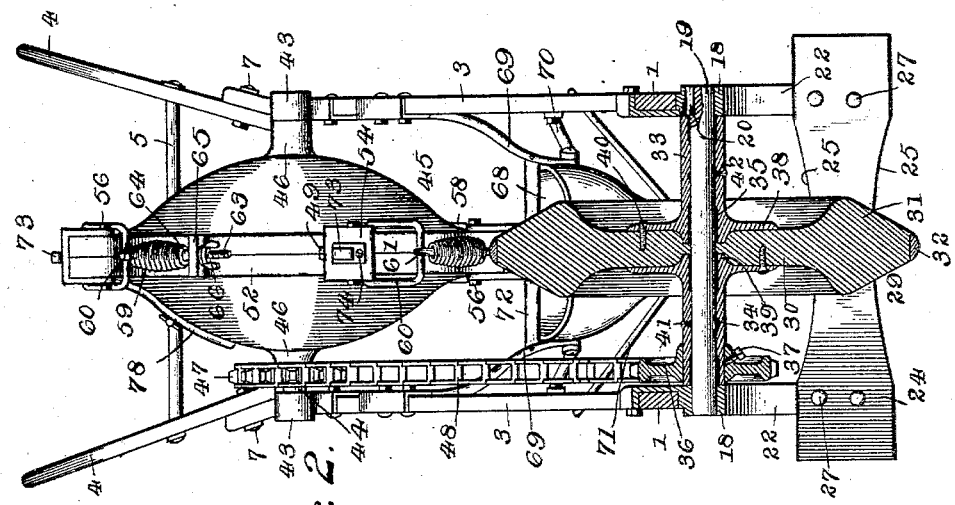

In the drawings, Figure 1 is a side view of a cotton-planter embodying my invention. Fig. 2 is a front view, partly in section, of the same on the line 2 2 of Fig. 1. Fig. 3 is a transverse vertical central section of the seed-hopper. Fig. 4 is a detail view in perspective of one of the seed-outlet valves. Fig. 5 is a detail view of the furrow-opening shovel and attachments, the contiguous portion of the beam being shown. Fig. 6 is a detail view in perspective of the furrow-closing shovel. Fig. 7 is a similar view of a modified form of furrow-closing shovel. Fig. 8 is a detail view of one of the bearings for the furrow-roller and the spring supporting devices for the furrow-closing shovel. Fig. 9 is a detail view in perspective of the trip employed to open the valves of the hopper. Fig. 10 is a detail vertical section of a hopper-valve and operating mechanism. Fig. 11 is a detail longitudinal section of the spring and attachments employed to close a hopper-valve.

Similar numerals of reference indicate corresponding parts in all the figures of the drawings.

1 designates a beam, the front end of which is provided with a clevis or similar means for attaching a team, as shown at 2, the rear portion of the beam being arranged at an inclination, as at 3, for the attachment of the handles 4, said handles being connected by a transverse brace-rod 5 and being connected to the extremities of the inclined portions of the beam by means of bolts 6 and 7, of which the latter operate in slots 8 in the extremities of the beam to provide for changing the inclination and hence the height of the handles to suit different operators.

Adjacent to the front end of the beam is arranged the furrow-opening mechanism 9 comprising a standard 10, a shovel 11 secured to the lower end of the standard by means of a bolt 12 and thumb-screw 13, and a brace 14, which is attached at one end to an intermediate point of the standard and extends at the other end through the beam in advance of the standard, where it is engaged by an adjustable nut 15. The upper end of the standard is provided with a series of perforations 16 for engagement by a bolt 17, said perforated end of the standard being fitted in a suitable approximately vertical opening in the beam and being engaged in one of its perforations to secure the furrow-opening shovel at the desired depression to form a furrow of the required depth. By adjusting the nut 15, which engages the upper end of the brace 14, the inclination of the standard and hence of the shovel may be varied.

Depending from the beam, which, as will be seen from the drawings, Figs. 2 and 5, is doubled to form parallel sides arranged in planes parallel with a central plane embracing the clevis, are bearings 18 for the reception of the extremities of a transverse shaft 19 held from rotation by means of a key 20, said bearing being provided with a rearward horizontal extension 21, to the under side of which is bolted a spring shovel-supporting arm 22. Interposed between this supporting-arm and the under side of the extension 21 is an auxiliary spring 23 designed to exert a downward pressure upon the supporting-arm, which is curved downward at its rear end to form a standard for a furrow-closing shovel 24.

In Figs. 1, 2 and 6 the furrow-closing shovel is shown as a flat plate provided in its upper and lower edges with cut-away portions 25 forming concave edges adapted to span the furrow, said plate being inclined forward toward its upper edge in order to move with freedom over the surface of the soil, and when this form of shovel is employed I interpose a spacing-bracket 26 between the standard on the arm 22 and the rear side of the plate, said plate and bracket being held in place by suitable bolts 27. In the modification shown in Fig. 7 the furrow-closing shovel 28 is tapered toward its lower end in a manner similar to the ordinary form of shovel used for this purpose.

Mounted upon the spindle 19 between the sides of the beam is the furrow-roller 29, having a hard-wood disk or body portion 30 provided with an enlarged V-shaped periphery 31. An annular metal tire 32 is applied to the apex of the angle formed by the periphery of the disk to receive the greater portion of the wear in use, said tire being replaceable when worn or otherwise injured. The disk or body portion of the roller is held in place upon the spindle by means of a bearing-box 33 provided with suitable oil-channels 34 and cut away at intermediate points, as shown at 35, to reduce the bearing-surface. The ends of this bearing-box are arranged approximately in contact with the inner surfaces of the sides of the beam, and secured upon the same at one end is a chain-wheel 36, said wheel being secured to the box by means of a set-screw 37. The box is preferably formed of separable sections, as indicated in Fig. 2, each section having a flange 38 to bear against the side surface of the disk and a boss 39, which enters a central cavity in the side of the same, said flanges being secured in place by means of screws 40. Screw-caps 41 are fitted in the oil-holes 42 to communicate with the oil-grooves in the bearing-box.

Secured by keys 43ª in bearings 43 near the upper ends of the sides of the beam are the outer extremities of transverse spindles 44, upon the inner ends of which, between the sides of the beam, is mounted the rotary seed-hopper 45, which, in cross-section, is approximately elliptical, and which is provided at diametrically-opposite points of its sides with sleeves 46 fitting upon the spindle. The spindle 44 does not extend through the center of the hopper, as in the case of the furrow-roller, to avoid obstructing the interior of the hopper, and secured by a screw 46ª to one of the sleeves 46 is a chain-wheel 47 of less diameter than the chain-wheel 36 and connected therewith by means of a chain 48 for communicating motion from the furrow-roller to the hopper. The hopper is constructed of detachable sections united upon a line described at the major circumference thereof, the sections being provided with perforated ears 49 engaged by screws 50, and the sections are provided upon their inner surfaces with agitating-spurs 51 to prevent packing of the seed in the hopper.

The hopper is provided with an annular interior channel 52, with which communicate a plurality of outlet or seed openings 53 provided with independent valves 54. These valves are segmental in construction and are provided with opposite lateral arms 55 pivoted by means of bolts 56 to the opposite sides of the hopper and terminating in stop-lugs 57 for engagement with stop-shoulders 58 when the valves are in their closed positions. These valves are normally held closed by means of springs 59, to which they are connected by links 60 and eyes 61, said eyes being provided with conical extensions 62, which fit in the reduced extremities of the springs and are thereby held in place. Means for adjusting the tension of the springs are also provided and consist of stems 63 provided with conical enlargements or heads 64 fitting in the extremities of the springs, said stems engaging perforated ears 65 bolted to the periphery of the hopper, and thumb-nuts 66 engaging the threaded extremities of said stems. By adjusting the thumb-nuts the tension of the springs may be varied to secure the desired result in operation.

Arranged beneath the hopper in rear of and close to the rear side of the furrow-wheel is a seed chute or conductor 67 adapted to convey the seed from the outlet-openings of the hopper and deposit the same in the furrows opened by the devices provided for that purpose, seed being deposited in the chute or conductor by the several outlet-openings of the hopper successively as they reach a position over the flared or enlarged mouth 68 of the chute. This chute is held in position under the hopper by means of depending supporting-arms 69 secured at their upper ends to the beam, upper and lower braces 70 and 71 extending rearwardly from the beam and engaging the chute to prevent vibration in operation.

Supported by suitable means, hereinafter described, contiguous to the upper end of the chute or conductor is a trip 72, Fig. 10, arranged transversely in the path of triggers 73 carried, respectively, by the seed-outlet valves, said triggers being detachably secured to said valves by means of screws 74 and being adapted as they engage the trip to withdraw the valves from the outlet-openings to a greater or less extent and allow the escape of a greater or less quantity of seed. In order to provide for varying the amount of seed deposited in each hill the trip 72 is adjustably secured to lugs 75 rising from the lower extremities of the supporting-arms 69, such adjustment being attained by means of bolts 76, which engage vertical slots 77 in the trip. It is obvious that by adjusting the trip downwardly the trigger will be deflected to a less extent, and hence the valve will open to allow the escape of a smaller amount of seed than when the trip is arranged with its upper edge nearer to the plane of the periphery of the hopper, and it is obvious that by removing one or more of the triggers from the valves the intervals between the hills may be varied.

inasmuch as under such circumstances the valves from which the triggers have been removed will pass the trip without operation. A suitable opening is provided in the side of the hopper for the introduction of seed, said opening being provided with a door or closure 78.

The operation of the improved mechanism will be readily understood from the foregoing description without a detail explanation thereof, and it will be obvious that after the opening of the furrow by the shovel provided for that purpose the sides and bottom of the furrow will be rolled and rendered, to a certain extent, compact by means of the furrow-roller, after which the seed will be dropped at intervals to form hills at the desired distance apart, and, finally, the soil contiguous to the furrow will be thrown thereinto to cover the seed. The resilience of the supporting-arm 22 provides for the riding of the furrow-closing shovel over the surface thereof without risk of breaking or otherwise injuring the parts, and as provision is made for detaching said arm the same may be replaced at a small cost when broken.

It will be seen that the chute or conductor is constructed of detachable side sections to agree with the construction of the hopper, thus simplifying the construction and reducing the cost of manufacture.

It will be understood that various changes in the form, proportion, and the minor details of construction may be resorted to without departing from the spirit or sacrificing any of the advantages of this invention.

Having described my invention, what I claim is—

1. In a planter, the combination with a frame and furrow-opening devices, of a revoluble hopper of an approximately elliptical cross-sectional construction comprising twin opposite separable semielliptical sections and secured together at their peripheries by bolts, the spaced outlet-openings in the hopper being formed in the contiguous peripheries of the sections, spring-closed valves normally closing said outlet-openings and mounted upon pivots parallel with the axis of the hopper, a stationary trip arranged in the path of projections on the valves to be engaged successively thereby, and means for imparting a continuous rotary motion to the hopper, substantially as specified.

2. In a planter, the combination with a frame and furrow opening and closing devices, of a revoluble hopper provided with seed-outlet openings, means for imparting a continuous rotary motion to the hopper, spring-closed pivotal valves for the outlet-openings, a stationary trip supported by the frame and arranged in the path of projections on the valves to open the latter, said trip being adjustable toward and from the pivots of the valves to vary the extent of opening of the valves, and means for securing the trip at the desired adjustment, substantially as specified.

3. In a planter, the combination with a frame and furrow opening and closing devices, of a revoluble hopper provided with seed-outlet openings, means for imparting a continuous rotary motion to the hopper, spring-closed pivotal valves for the outlet-openings, lugs arranged contiguous to the planting-point, a trip secured by screws to said lugs and vertically slotted to provide for the adjustment of the trip toward and from the pivots of the valves, and triggers carried by the valves for engagement by the trip, the trip by its adjustment being adapted to be arranged more or less in the path of the triggers to vary the extent of opening of the valves, substantially as specified.

4. In a planter, the combination with a frame and furrow opening and closing devices, of a revoluble hopper provided with a plurality of seed-outlet openings, means for imparting rotary motion to the hopper, spring-closed valves for the outlet-openings, a trip arranged contiguous to the planting-point, and triggers removably secured to the valves and adapted to successively engage the trip to repress and open the valves, the removability of the triggers providing for varying the intervals between hills, inasmuch as only those valves provided with triggers are opened when they reach the planting-point, substantially as specified.

5. In a planter, the combination with a frame and furrow opening and closing devices, of a revoluble hopper of approximately elliptical cross-sectional construction and having a reduced periphery in which is formed an annular channel 52, a plurality of seed-outlet openings being formed in the periphery of the hopper in communication with said channel, valves for the outlet-openings having parallel arms arranged upon opposite sides of the reduced periphery of the hopper and pivoted thereto by means of pivots arranged parallel with the axis of the hopper, springs for normally holding the valves in their closed position, stop devices including stop-lugs 57 and stop-shoulders 58 to limit the movement of the valves when they reach their closed position, and a stationary trip arranged in the path of triggers projecting radially from the valves, substantially as specified.

In testimony that I claim the foregoing as my own I have hereto affixed my signature in the presence of two witnesses.

WILLIAM W. KENT.

Witnesses:
JOHN A. BURGESS,
W. H. EZELL.